United States Patent [19]
Pastor

[11] Patent Number: 5,247,741
[45] Date of Patent: Sep. 28, 1993

[54] FOOTWEAR HAVING A MOLDED SOLE

[75] Inventor: Gerardo Pastor, Hialeah, Fla.

[73] Assignee: Suave Shoe Corporation, Miami Lakes, Fla.

[21] Appl. No.: 847,124

[22] Filed: Mar. 6, 1992

[51] Int. Cl.$^5$ .............................................. A43B 3/14
[52] U.S. Cl. .................... 36/11.5; 12/142 S; 12/142 T
[58] Field of Search ............... 36/11.5, 14, 12; 12/142 S, 142 RS, 142 T

[56] References Cited

U.S. PATENT DOCUMENTS

| | | |
|---|---|---|
| 1,823,445 | 9/1931 | Goldstone . |
| 1,823,445 | 9/1931 | Goldstone . |
| 2,110,839 | 3/1938 | Ferriot . |
| 2,251,468 | 8/1941 | Smith . |
| 2,468,573 | 4/1949 | Rimer ............... 36/11.5 |
| 2,481,281 | 9/1949 | Bender .............. 36/11.5 |
| 2,518,649 | 8/1950 | Tydings et al. ...... 36/11.5 |
| 2,581,728 | 1/1952 | Spack . |
| 2,663,097 | 12/1953 | Giese, Jr. . |
| 2,689,375 | 9/1954 | Hugger . |
| 2,995,840 | 8/1961 | Greenbaum ......... 36/14 |
| 3,407,517 | 10/1968 | Gessner ............. 36/11.5 |
| 3,445,874 | 5/1969 | Brauner . |
| 3,474,477 | 10/1969 | London et al. . |
| 3,483,582 | 12/1969 | Morgan . |
| 3,552,039 | 1/1971 | Fukuoka . |
| 3,599,353 | 8/1971 | Magidson ........... 36/11.5 |
| 3,806,974 | 4/1974 | DiPaolo . |
| 3,824,716 | 7/1974 | DiPaolo . |
| 3,855,657 | 12/1974 | Mazzotta . |
| 4,150,455 | 4/1979 | Fukuoka . |
| 4,170,802 | 10/1979 | Roy . |
| 4,214,334 | 7/1980 | Williams et al. ..... 36/11.5 |
| 4,266,314 | 5/1981 | Londner epouse Ours . |
| 4,266,349 | 5/1981 | Schmohl . |
| 4,314,412 | 2/1982 | Anderson et al. .... 36/100 |
| 4,347,637 | 9/1982 | Ardito . |
| 4,390,357 | 8/1983 | Batra . |
| 4,407,034 | 10/1983 | Ralphs . |
| 4,475,258 | 10/1984 | Panicucci .......... 12/142 S |
| 4,494,266 | 1/1985 | Bartneck . |
| 4,562,606 | 1/1986 | Folschweiler . |
| 4,616,430 | 10/1986 | McQuiggin . |
| 4,677,767 | 7/1987 | Darby . |
| 4,760,652 | 8/1988 | Austin . |
| 4,899,465 | 2/1990 | Bleimhofer et al. . |

FOREIGN PATENT DOCUMENTS

3813993A1 11/1989 Fed. Rep. of Germany .

Primary Examiner—Steven N. Meyers
Assistant Examiner—Ted Kavanaugh
Attorney, Agent, or Firm—Lowe, Price, LeBlanc & Becker

[57] ABSTRACT

A mold for making a sandal having an injected molded sole comprises a last for receiving an upper, a ring, and a sole plate. The last, ring and sole plate form a sealed cavity where the sole is formed in response to plastic material being injected into the sealed cavity. The injected plastic material has tendencies to (1) adhere to portions of the upper on a portion of the last forming a wall of the sealed cavity and (2) remain in the cavity as the last is removed from the cavity. The portion of the last forming the sealed cavity wall includes an ear extending into the cavity for overcoming the tendency of the injected plastic material to remain in the cavity. The ear frictionally engages an interior surface of the sole to pull the sole from the cavity as the last is being removed from the cavity.

23 Claims, 7 Drawing Sheets

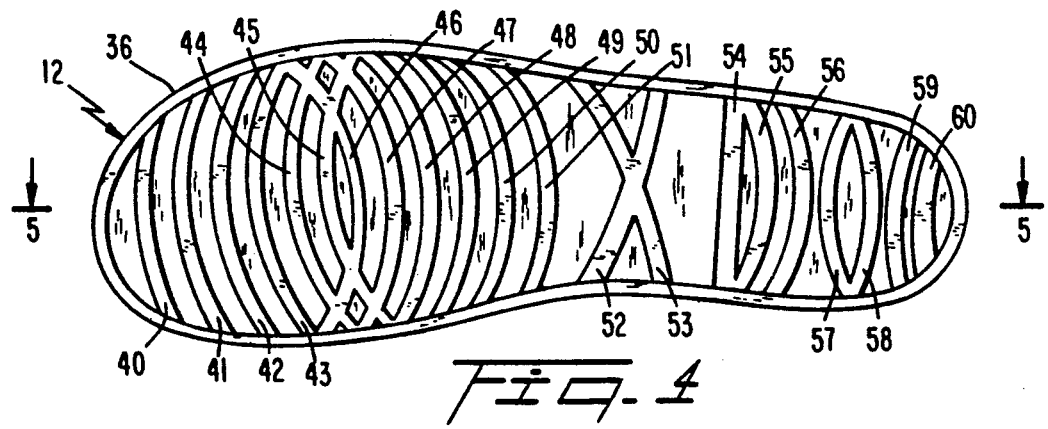
Fig. 4
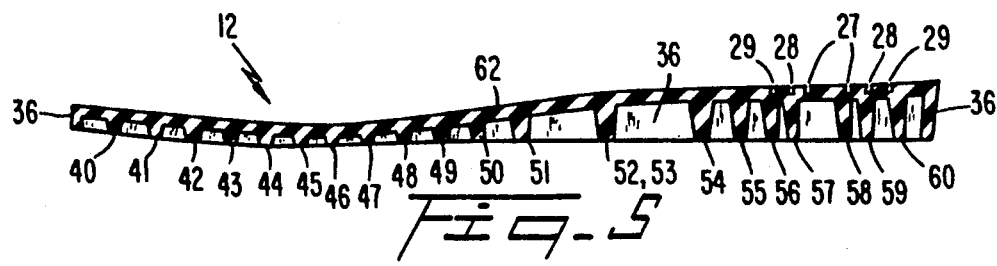
Fig. 5
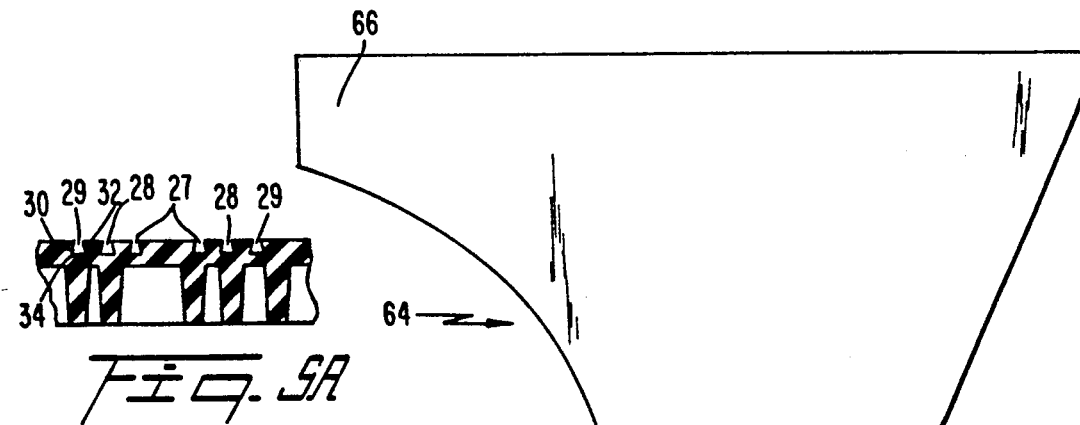
Fig. 5A
Fig. 6

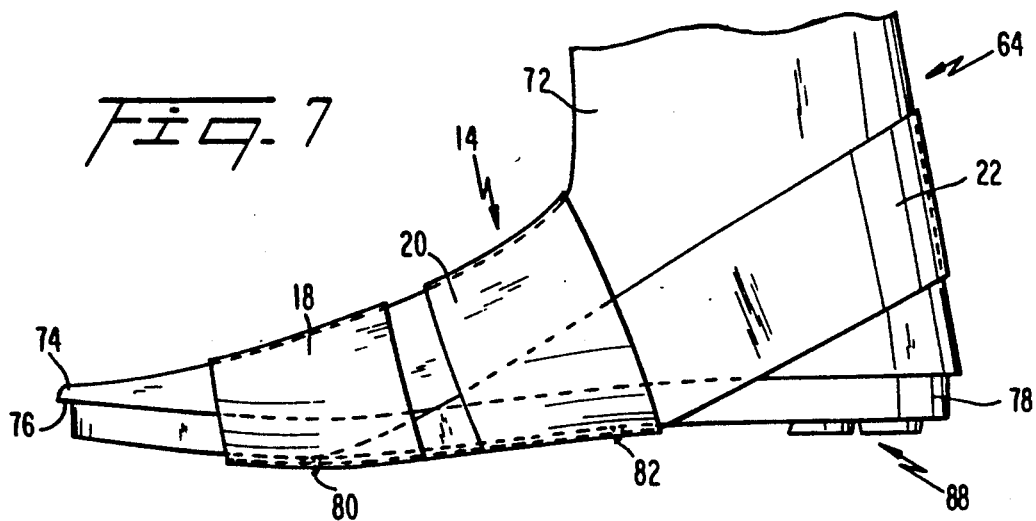
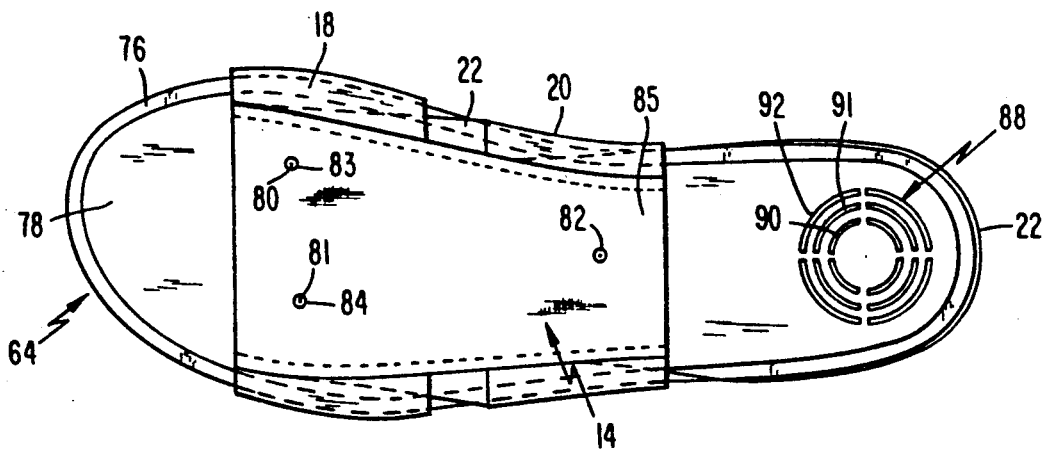
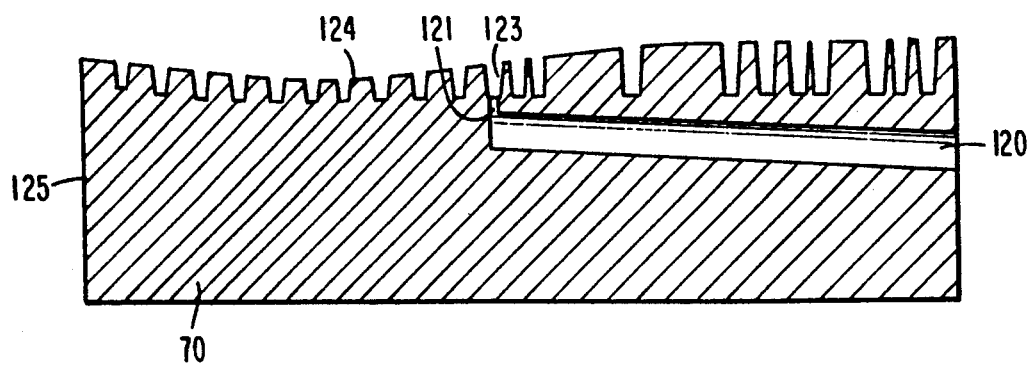

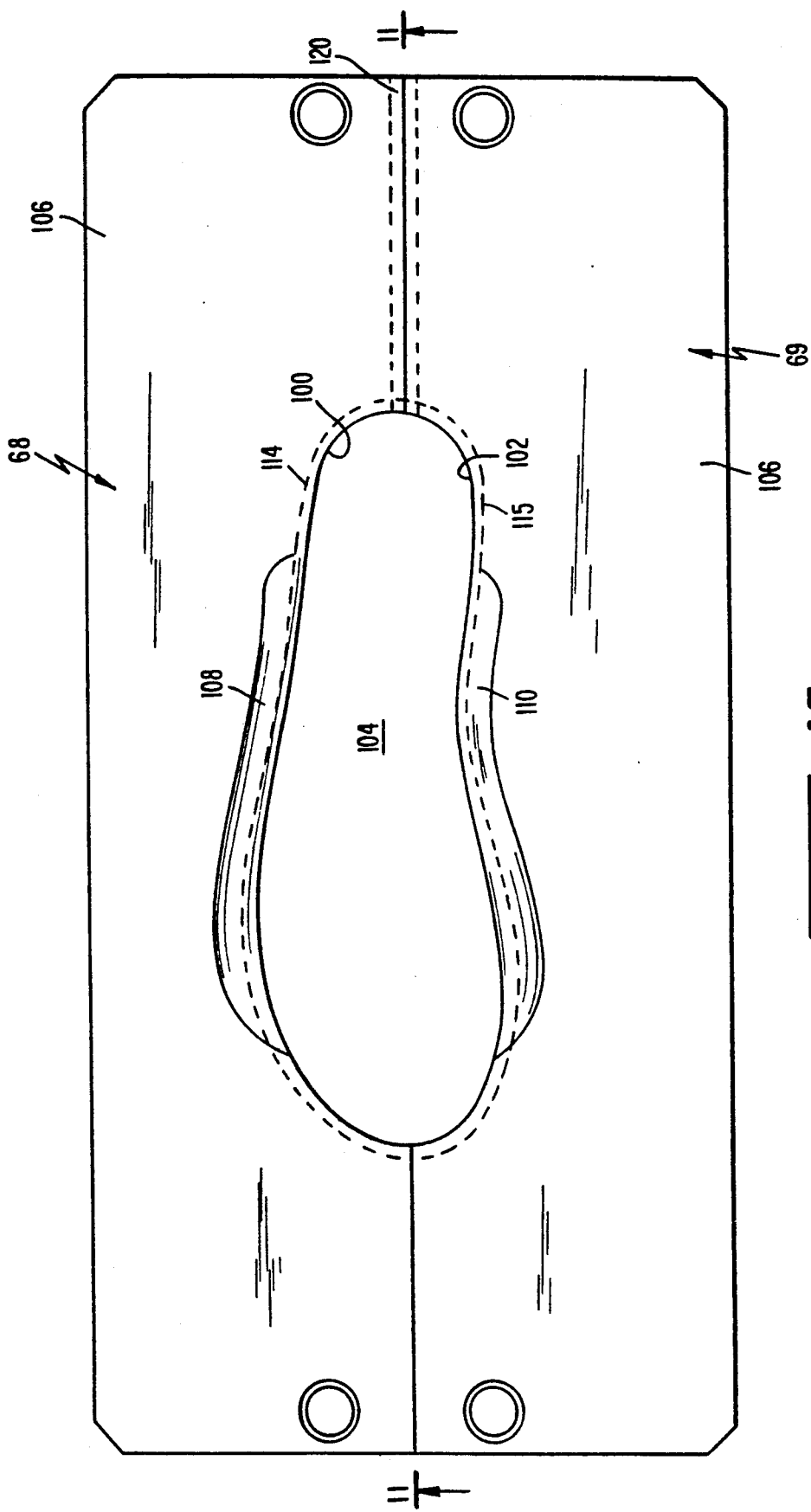

FOOTWEAR HAVING A MOLDED SOLE

FIELD OF INVENTION

The present invention relates generally to apparatus for and method of making footwear having injected molded soles and to the resulting product, and, more particularly, to a mold having a ring with an outwardly extending sidewall portion where a bead of the sole is formed, to a method of making footwear using such a mold, and to a sandal having a sole plate to which are adhered straps, wherein bottom surfaces of the sole plate and strap are adhered to the molded sole during the molding operation and to a mold having a last with ear means for facilitating removal of a sandal from a mold cavity.

BACKGROUND ART

One commercially available sandal includes a flexible sole, to which are attached a pair of flexible straps extending over a forward part of a foot of a wearer and an elastic strap extending over the heel of the wearer. The heel strap extends from the forward part of the sole, in the vicinity of the straps that extend over the forward part of the foot, around the heel of the wearer. In one arrangement, the sole has a laminated ethyl vinyl acetate (EVA) construction. The straps have been manually attached to the sole between upper and intermediate laminated layers so they extend through elongated slits in the upper layer. The manual operations tend to increase the cost of producing the sandals.

London et al., U.S. Pat. No. 3,474,477 discloses a method of and apparatus for making sandals and other open top footwear. A prefabricated upper including a sole piece, to which are adhered toe and heel straps, is secured to a last having flexible lower corners. The last includes a nail or the like for piercing the sole piece, to assist in holding the upper in situ on the last. The last with the upper secured thereto fits into a mold cavity formed by a sole plate and a pair of ring members. The top of the cavity is defined by a pair of relatively sharp sealing lips that engage straps on the upper, and flexible material on the last lower edges.

The relatively sharp lips which bear against the sides of the straps would appear to have a tendency slightly to damage the straps. In addition, the sharp lips have a tendency to wear so that the seal formed thereby would appear quickly to deteriorate with use. In addition, the need for flexible material in the last has a tendency to increase the cost of the mold. The flexible material in the last is incapable of withstanding the repeated high temperature cycling associated with injection molding operations. The molded sole has a tendency to adhere to the flexible material on the last edges.

It is, accordingly, an object of the present invention to provide a new and improved method of and apparatus for making footwear having injection molded soles.

Another object of the invention is to provide a new and improved apparatus for and method of making injection molded footwear wherein the number of manual operations is reduced relative to the prior art and wherein relatively inexpensive and long lasting molds are employed.

A further object of the invention is to provide a new and improved apparatus for and method of making sandals including a toe strap and a heel strap connected to the sole in the vicinity of the toe strap.

A further object of the invention is to provide a new and improved, relatively inexpensive sandal including toe and heel straps made of flexible material.

SUMMARY OF THE INVENTION

In accordance with one aspect of the invention there is provided a new and improved method of making a sandal having a molded sole, an elastic heel strap, and at least one other elastic strap extending over a forward portion of a foot. The heel strap extends from the sole in the vicinity of the other strap around the heel. The sandal includes an upper including a sole piece to which are attached the heel and other strap. The method includes placing the upper on a last by (a) putting the top of the sole piece against a bottom surface of the last, and (b) stretching the heel and other strap around heel and forward portions of the last. Then the last with the upper thereon is placed in a molding assembly including a sole mold cavity. Plastic material is then injected into the sole mold cavity while the cavity is sealed by a sealing surface of the last so that the plastic material adheres to the bottom of the sole fabric and a portion of the straps. The sealing surface of the last includes ear means extending into the mold cavity; the injected plastic material forms around the ear means, preferably located in the vicinity of the heel of the sandal. Then the last with the upper thereon is removed from the mold cavity. It has been found that the sole has a tendency to stay in the cavity as the last is removed from the cavity because the heel strap can slip on the last. This tendency is overcome by frictional contact of the injected plastic material around the ear means during the injecting step.

In accordance with a further aspect of the invention there is provided a new and improved mold for use in making footwear having an injection molded sole to which is adhered an upper during a molding operation. The mold comprises a last for receiving the upper, a ring, and a sole plate. The last, ring and sole plate form a sealed cavity where the sole is formed in response to plastic material being injected into the sealed cavity. The injected plastic material has tendencies to (1) adhere to portions of the upper on a portion of the last forming a wall of the sealed cavity and (2) remain in the cavity as the last is removed from the cavity. The portion of the last forming the sealed cavity wall includes an ear extending into the cavity for overcoming the tendency of the injected plastic material to remain in the cavity. The ear frictionally engages an interior surface of the sole to pull the sole from the cavity as the last is being removed from the cavity.

In a preferred embodiment, the ear has a flared wall in a plane substantially at right angles to the portion of the last forming the sealed cavity wall and is configured to form a groove in a top surface of the sole.

In accordance with another aspect of the invention, a sandal comprises a molded sole having a top and an upper including: a sole piece, an elastic heel strap attached to the sole piece and at least one other elastic strap attached to a forward portion of the sole piece. The other strap extends over a forward part of a foot. The heel strap is attached to the molded sole adjacent the other strap. The upper is bonded to the molded sole during the molding process for the molded sole so the top of the molded sole is bonded to bottom surfaces of the sole piece and the straps.

The sandal preferably includes a lip extending beyond regions of the molded sole to which the straps and the sole material are bonded so the lip protects a wearer's foot and the straps. The top of the molded sole preferably includes a groove with an outwardly flared side wall in a cross section substantially at right angles to the top of the molded sole. Plural such grooves are included, each including a pair of outwardly flared side walls to assist in removal of the sandal from the mold cavity. The grooves are preferably adjacent the sandal heel.

In the preferred embodiment, the sole piece has a length considerably less than the length of the molded sole (e.g. about one-half the length of the molded sole) and is centrally located on the molded sole. The top of the sole piece and the molded sole preferably have the same color so the presence of the sole piece on the molded sole is difficult to perceive visually. The sole piece has a length substantially equal to the distance required for the straps to be attached to it, resulting in a significant reduction in the amount of material and cost of the sole piece. In addition, it is easier to insert a relatively small sole piece onto the last than to insert a sole piece having a length equal to the entire sole. Hence, reductions in cost of the sandal are provided by reducing the area of sole piece material and the amount of labor required to place the sole plate onto the last.

In accordance with a further aspect of the invention there is provided a new and improved method of making footwear having an injected molded sole to which is adhered an upper including a sole piece having a top surface and foot encircling material. The method comprises placing the upper on a last so the top surface of the sole piece and portions of the foot encircling material extending beyond the sole piece contact a bottom portion of the last. Then the last is inserted into a mold cavity in a ring segment of a mold. A sole plate of the mold is in the cavity while the last is in the cavity. The last and ring have snugly fitting side walls while the last and sole plate are in the cavity to form a sealed mold cavity. The sealed mold cavity has another side wall in the ring between the bottom of the last and the top of the sole plate. The another side wall extends beyond snugly fitting side walls of the ring and last. Plastic material is injected into the cavity while the snugly fitting side walls are in situ and the bottom of the last and the top of the sole portion are substantially aligned with top and bottom edges of the another side wall portion so that the plastic fills the cavity and adheringly contacts the bottom of the sole piece and a bottom portion of the foot encircling material to form a bead extending beyond the sole piece and the foot encircling material. The thus formed footwear is removed from the cavity after the plastic has adhered to the bottom of the sole plate and the bottom portion of the foot encircling material.

Because of the snugly fitting side walls, a better seal is attained than is provided with the prior art London et al. structure, having a sharp edge. In addition, the snugly fitting side walls are subject to less wear than the sharp edge mold cavity disclosed by London et al.

In accordance with a further aspect of the invention, a molded rubber-like flexible sole for a sandal comprises a platform having a substantially constant thickness between bottom and top surfaces of the platform; the platform top surface constitutes the sandal sole top surface against which the sole of the wearer bears. A flange depending downwardly from a peripheral edge of the bottom surface has a bottom somewhat planar edge. Many strengthening ribs extending downwardly from the platform bottom surface have bottom flat edges lying substantially in the same plane as the bottom flange edges. The ribs extend lengthwise generally at right angles to the longitudinal axis of the sole between and in engagement with opposite portions of the flange. At least some of the ribs cross each other at regions removed from the flange.

The stated relationship of the flanges and ribs enables the sole to have an elevated heel, while minimizing the amount of material required to form the sole and yet provide the sole with substantial transverse stability.

Preferably, the lengths of the ribs and the flange in planes at right angles to the plane of the bottom flat edge are such that a heel portion of the sole top surface is elevated with respect to the planar surface relative to the elevation of a ball of the foot portion of the insole.

In a preferred embodiment, the upper surface includes a groove with an outwardly flared side wall in a cross section substantially at right angles to the top of the molded sole. The groove assists in removing the sole from a molding cavity.

In accordance with still another aspect of the invention, there is provided a mold for use in making footwear having an injection molded sole to which is adhered during a molding operation bottoms of a sole piece and foot encircling material extending beyond the sole plate. The molded sole includes a bead extending beyond the foot encircling material. The sole piece and foot encircling material are adhered to each other prior to the molding operation to form an upper. The mold comprises a ring having a side wall and an upper face and a cavity where the sole is formed during an injection molding operation; the cavity has a side wall extending beyond the ring side wall. A sole plate fitting snugly against the ring side wall has a passage for supplying sole forming injected plastic into the cavity through a top surface of the sole plate. A last for receiving the upper has a lower portion having a side wall fitting snugly against the ring side wall and a bottom surface for receiving the sole piece and the portion of the foot encircling material adhered to the molded sole during the molding operation. The cavity side wall extends between the bottom surface of the last lower portion and the top surface of the sole plate. The side wall portion extends outwardly beyond the bottom of a downwardly extending appendage of the last. The sole is formed in the cavity between the bottom surface of the last lower portion and the sole plate top surface. The bead is formed in the portion of the cavity between the ring and cavity side walls.

Preferably, the ring upper face includes shallow indentations that intersect the side wall and are disposed on opposite sides of the cavity. The indentations are (1) arranged so they do not enter the cavity, and (2) positioned to receive portions of the foot encircling material not adhered to the sole during the molding operation. The indentations in the top surface of the ring accommodate the straps and help to obviate the need for resilient or compressible material on the last edges, as disclosed by London et al.

The above and still further objects, features and advantages of the present invention will become apparent upon consideration of the following detailed description of a specific embodiment thereof, especially when taken in conjunction with the accompanying drawings.

BRIEF DESCRIPTION OF THE DRAWING

FIG. 4 is a bottom view of the sandal illustrated in FIG. 1;

FIG. 5 is a side sectional view of the sole of the sandal;

FIG. 5A is an enlarged side sectional view of a portion of the sole;

FIG. 6 is a side view of a last used to make the sandal illustrated in FIG. 1;

FIG. 7 is a side view of the last illustrated in FIG. 6, with the upper illustrated in FIG. 2 placed thereon;

FIG. 8 is a bottom view of the last illustrated in FIG. 6, with the upper secured thereto;

FIG. 9 is a side sectional view of a sole plate used in combination with the last illustrated in FIG. 6;

FIG. 10 is a top view of a pair of ring mold segments used with the last of FIG. 6 and the sole plate of FIG. 9;

DETAILED DESCRIPTION OF THE PREFERRED EMBODIMENT

Figure 1:
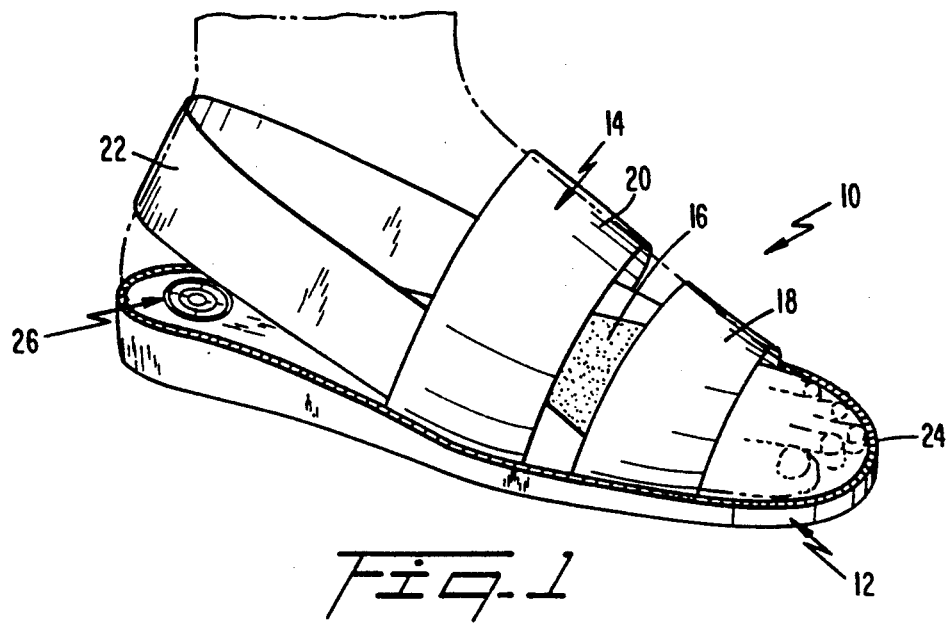
FIG. 1 is a perspective view of a sandal in accordance with a preferred embodiment of the present invention.
Figure 2:
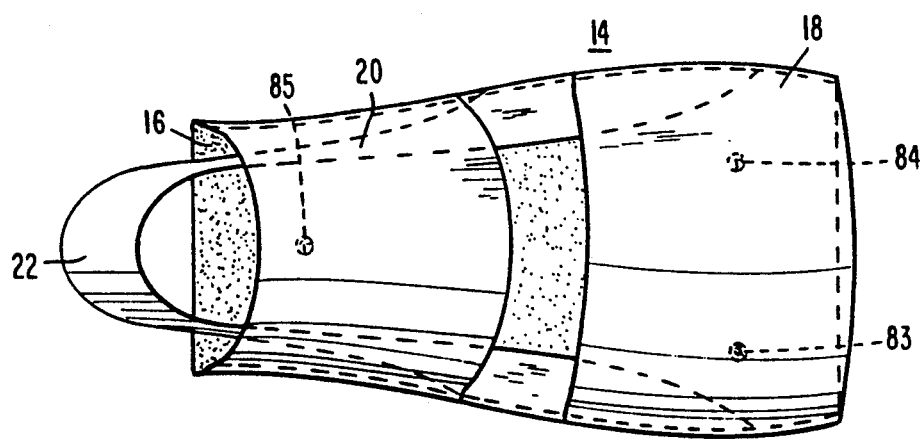
FIG. 2 is a top view of an upper included in the sandal of FIG. 1, prior to the upper being molded to the sole of the sandal.
Figure 3:
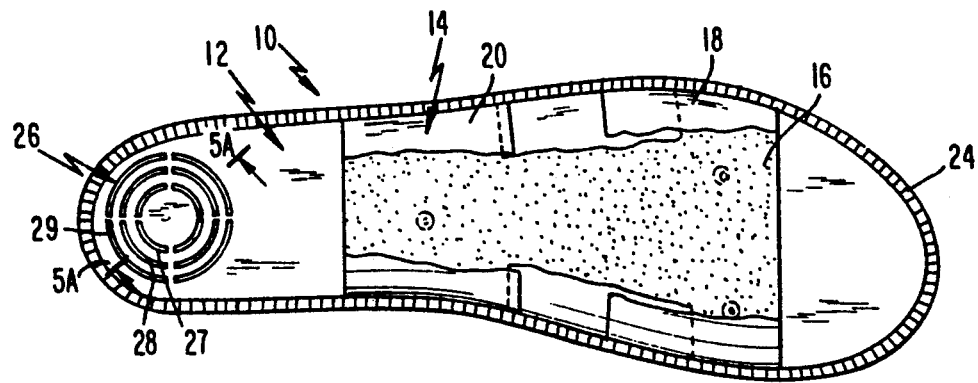
FIG. 3 is a top view of the sole and a portion of the upper illustrated in FIG. 1.

Reference is now made to FIGS. 1-3 of the drawing wherein sandal 10 is illustrated as including flexible, molded sole 12, preferably fabricated of polyvinyl chloride, to which upper 14 is bonded during the molding operation for sole 12. Upper 14 includes fabric sole piece 16, to which are sewn elastic fabric straps 18, 20 and 22. Straps 18 and 20 extend over forward portions of a wearer's foot, while strap 22 is a heel strap.

Sole piece 16 has a total length (along the longitudinal axis of sole 12) of approximately one-half of the total length of sole 12. Sole piece 16 is located approximately in the mid-portion of sole 12, so the forward end of the sole piece is displaced somewhat less than one-quarter of the length of sole 12 from the toe thereof. Opposite edges of straps 18, 20 and 22 are sewn to opposite edges of sole piece 16. Forward and rear edges of straps 18 and 20 are respectively aligned with forward and rear edges of sole piece 16. Heel strap 22 is sewn to an intermediate portion of sole piece 16 so the rear edge of the heel strap is slightly forward of the front edge of strap 20, between straps 18 and 20, while the front edge of the heel strap intersects front strap 18. Heel strap 22 extends rearwardly of sole piece 16 and beneath strap 20.

Upper 14 is secured to and becomes integral with the upper face of sole 12 during a molding operation while the sole is formed. The width of sole piece 16 is substantially less than the width of sole 12 and straps 18, 20 and 22 extend beyond sole piece 16 to contact the upper face of sole 12. Bottom surfaces of straps 18, 20 and 22 are integral with and secured to sole 12 during the molding operation for the sole, to provide an excellent bond between upper 14 and sole 12. The stated construction provides desired flexibility and stretching characteristics to the straps. Upon casual inspection, one does not even realize that sole piece 16 is secured to sole 12 because (1) the top of the sole piece and sole are preferably the same color (black) and (2) of the excellent adherence characteristics of the bottom surfaces of sole piece and straps 18, 20 and 22 to the top face of sole 12.

Bead 24, extending completely around the periphery of sole 12, is arranged relative to upper 14 such that the bottoms of straps 18, 20 and 22 are not connected to the bead. Thereby, wear protection is provided to straps 18, 20 and 22 and the foot of the wearer is protected because it is generally confined to a slightly indented portion of sole 12, within the confines of bead 24.

The upper face of sole 12 includes groove arrangement 26, located proximate the heel of the sandal on a segment of the sole upper surface removed from sole piece 16. Groove arrangement 26 assists in removing sandal 10 from a sealed mold cavity during the molding operation when sole 12 is formed and bonded to upper 14. In the preferred embodiment, groove arrangement 26 includes three circular coaxial circular-like series of grooves 27, 28 and 29. Each series of grooves 27-29 includes four individual grooves, each having an arcuate extent of slightly less than 90°. As illustrated in FIG. 5A, each of the grooves, in a cross section at right angles to the length of sole 12, is configured as a trapezoid, having sloping side walls 30 and 32 and base 34 that extends generally parallel to the top of the sole. Side walls 30 and 32 are flared outwardly from the top of sole 12 toward base 34 and extend in a direction so they are hidden from view from the top of the molded sole.

Sole 12 has appreciable side to side flexibility and substantial lengthwise stiffness so the sole bends easily from side to side as the wearer walks forward while resisting a tendency to twist about its longitudinal axis. A relatively small amount of material is used to form sole 12. To these ends, sole 12 includes flange 36, depending downwardly from bead 24; flange 36 extends completely around the sole periphery. Extending between opposite sides of flange 36 are transverse ribs 40-60. Each of ribs 40-60, except rib 54, has an arcuate shape; each of ribs 40-45 between the ball of the foot and the toe has an arc extending toward the toe while each of ribs 46-51, between the ball of the foot and the arch has an arc extending toward the heel. Ribs 52 and 53, located slightly behind the arch, continuously curve in the same direction toward the toe of the shoe and cross each other about the longitudinal center line of the sole. Ribs 43-48, in the vicinity of the ball of the foot, cross each other either at the edge of the sole or at a region displaced from the sole. Ribs 55, 56 and 58, in the vicinity of the heel, curve toward the heel. Rib 57 abuts against rib 58 in the vicinity of flange 36, while ribs 58 and 59 intersect each other in the center of the sole as do ribs 58 and 59. Rib 54, at the forward portion of the heel, extends completely across the sole in a straight line.

The wearer's foot rests on platform 62 of sole 12. Platform 62 has substantially the same thickness throughout sole 12 and a slight downward curvature, such that the toe and heel of the platform are slightly above the portion of platform 62 where the ball of the foot is located to optimize comfort for most wearers. The curvature of platform 62 is attained by providing flange 36 and ribs 40–60 with differing heights along the length of platform 62. Because of the voids in sole 12 between flange 36 and ribs 40–60 the amount of polyvinyl chloride needed to form sole 12 is relatively small to reduce the weight and cost of the sole.

The sandal illustrated in FIGS. 1 and 3 is formed by placing the upper illustrated in FIG. 2 on last 64, FIG. 6. Last 64 is completely fabricated of metal, preferably aluminum. Last 64 includes upper segment 66, attached, during the molding operation, to a rotating turret that pivots the last into place into a molding cavity formed by ring mold segments 68, 69, FIGS. 10 and 11, and sole plate 70, FIG. 9. Lower portion 72 of last 64 is configured similarly to the foot of a wearer of the sandal illustrated in FIG. 1. Extending completely around the periphery of the bottom of last lower portion 72 is lip 74 including lower planar surface 76. Extending downwardly from surface 76 is appendage 78, having a bottom surface configured the same as the top of platform 62. Downwardly depending from the bottom face of appendage 78 are spikes 80–82 which engage corresponding holes 83–85 on sole piece 16 when upper 14 is fitted onto last 64, as illustrated in FIGS. 7 and 8.

Figure 14:
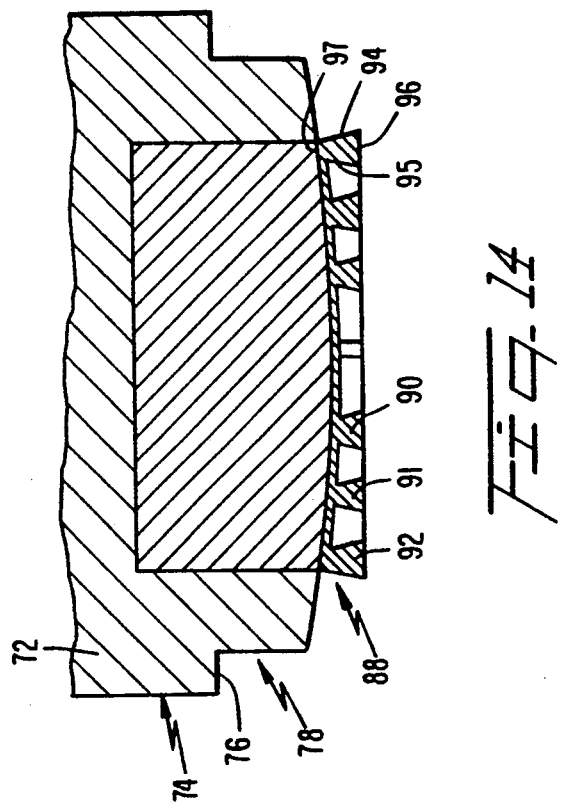
FIG. 14 is a cross-sectional view of the bottom of the last in the vicinity of the heel of the sandal.

Depending downwardly from the heel portion of appendage 78 is ear array 88, including three coaxial ear sets 90–92 having different radii. Ear sets 90–92 respectively form the series of grooves 27–29. Each of ear sets 90–92 includes four separate arcuate ears, each formed as a segment of a circle having an angular extent of slightly less than 90°. As illustrated in FIG. 14, the ears of each of sets 90–92 have a trapezoidal cross-section, with outwardly flared side walls 94 and 95, a flat lower base 96 and a somewhat curved upper base 97, forming the lower surface of appendage 78.

Figure 12:
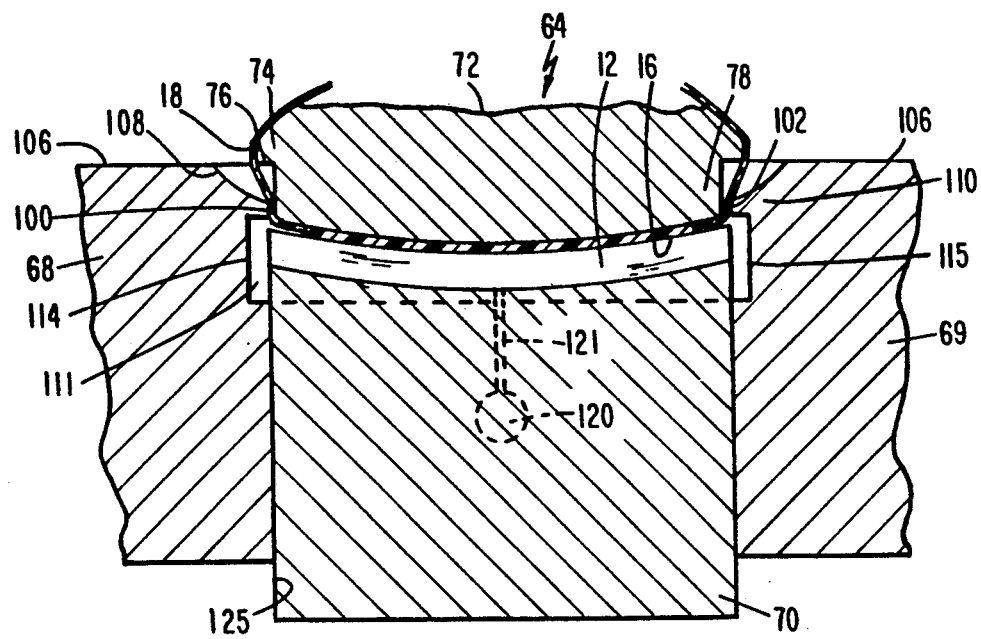
FIG. 12 is a sectional view through a portion of the ring mold segments illustrated in FIG. 10, with the upper illustrated in FIG. 2 on the last illustrated in FIG. 6, in combination with the sole plate of FIG. 9 to form a sealed mold cavity where the sandal sole is formed.
Figure 13:
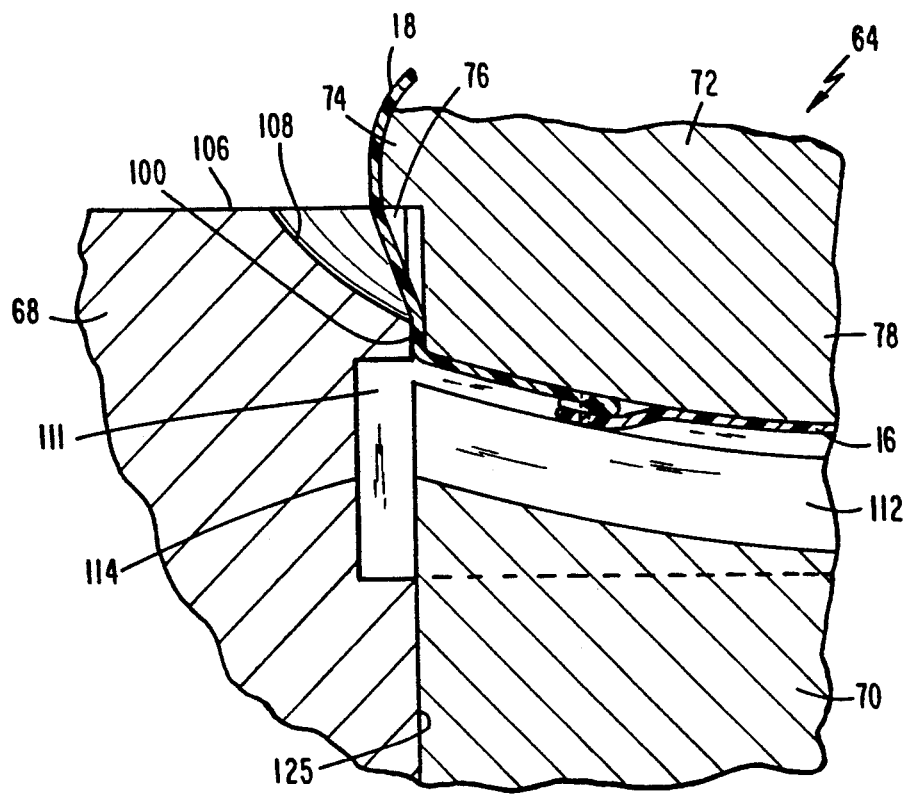
FIG. 13 is an enlarged view of the last, sealed mold cavity, a ring mold segment, portions of the upper and the sole plate.
Figure 15:
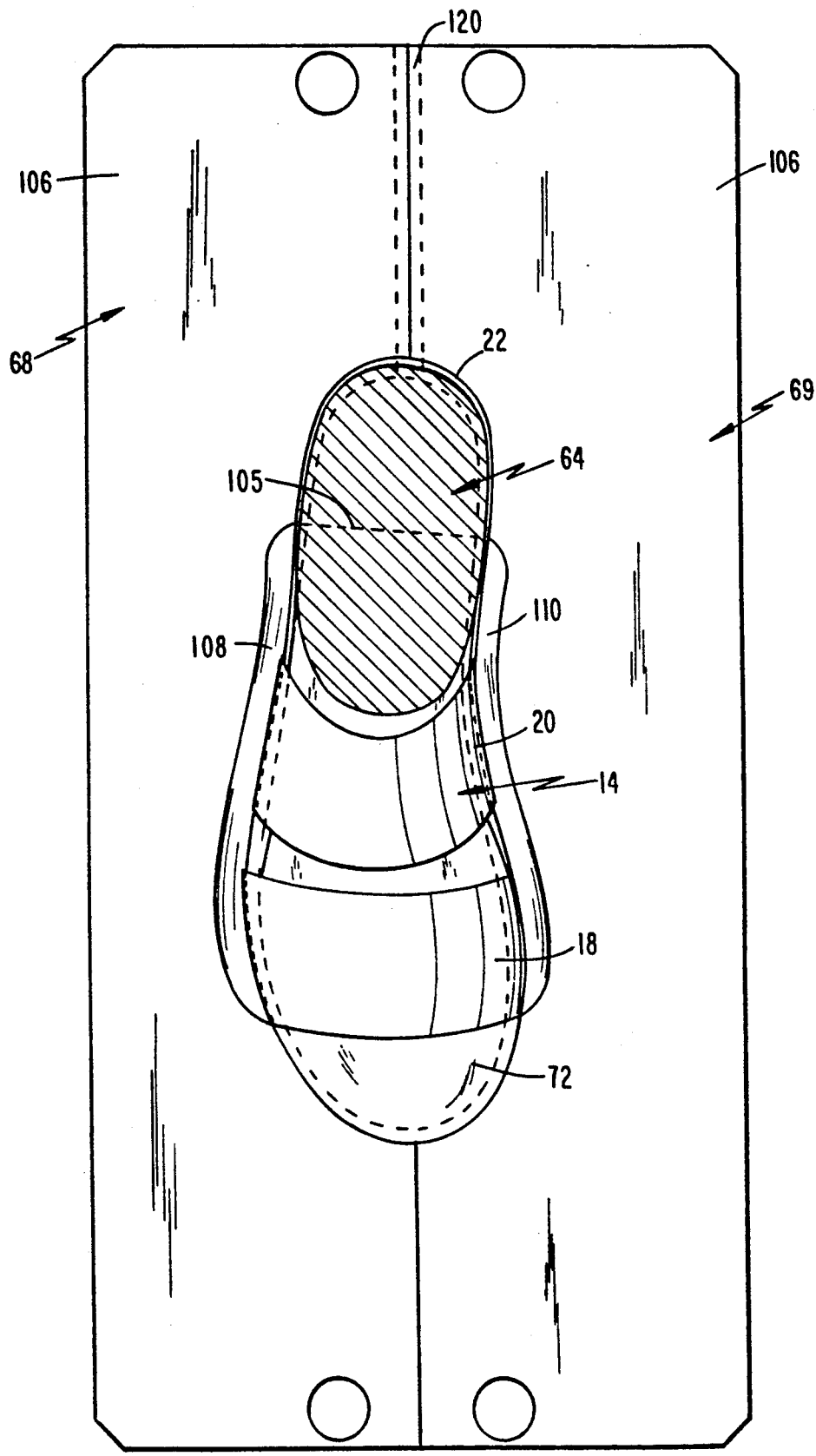
FIG. 15 is a top view of the sandal upper on the last while the last is positioned on the top of the ring mold.

As illustrated in FIGS. 7, 8 and 15, when upper 14 is placed on last 64, straps 18 and 20 extend around the forward segment of the last lower portion 72. Straps 18 and 20 extend over a substantial portion of the bottom surface of appendage 78, thence to the edge of surface 76 remote from appendage 78, as shown in FIGS. 12 and 13 for strap 18. Heel strap 22 extends around the heel portion of the last lower foot portion 72, such that the lowest edge of heel strap 22 is above surface 76, between the back edge of sole piece 16 and the heel of last 64.

Figure 11:
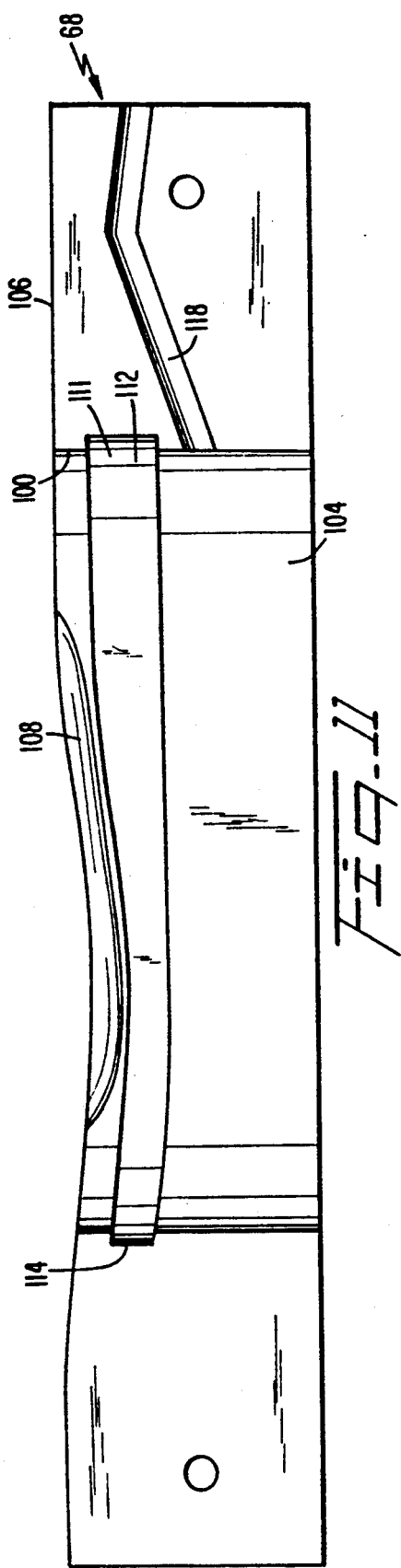
FIG. 11 is a side view of a ring mold segment illustrated in FIG. 10.

With upper 14 secured to last 64, the last is brought into contact with metal, preferably aluminum, ring mold segments 68, 69, FIGS. 10 and 11. Ring mold segments 68, 69 fit together and are respectively provided with side walls 100 and 102 to form opening 104. Top surface 106 of ring mold segments 68, 69 includes vertically extending indentations 108 and 110, each having a length along the longitudinal axis of opening 104 approximately the same as the length of sole piece 16; the back edge of sole piece 16 is indicated in FIG. 15 by dotted line 105. Indentations 108 and 110 accommodate straps 18, 20 and 22 and enable them to extend out of opening 104 around last 64 when the last is in place on top surface 106, such that last surface 76 engages top surface 106 and appendage 78 extends into opening 104 as in sealing relationship with side walls 100 and 102 because the side wall of the appendage fits snugly against side walls 100 and 102.

To enable bead 24 and flange 36 to be formed, opening 104 includes an enlarged interior portion 111 having side walls 114, 115 in ring segments 68, 69, respectively. Side walls 114, 115 extend beyond side walls 100 and 102 to assist in forming mold cavity 112 while sole 12 is made. The height of side walls 114, 115 is the same as the height of flange 36. Side walls 114, 115 are located outside of side walls 100 and 102 by a distance equal to the distance bead 24 protrudes from platform 62. Straps 18, 20 and 22 never enter enlarged interior portion 111 between side walls 100, 102 and side walls 114, 115 so the straps do not contact the portion of the molded sole formed in portion 111.

As illustrated in FIGS. 11–13 indentation 108 extends downwardly from ring top surface 106 so the bottom surface of the indentation is always a significant distance above the top surface of enlarged interior portion 111 where bead 24 and flange 36 are formed. Thereby, a significant length of wall 100 always subsists between the lowest edge of indentation 108 and the top surface of the cavity where the sole is molded. A portion of the vertical wall of appendage 78 and of straps 18, 20 and 22 bears snugly against walls 100, 102 to assist in sealing cavity 112. The minimum distance between the lowest edge of indentation 108 and the top surface of cavity 112 is typically about one-eighth of an inch. This arrangement provides excellent sealing of cavity 112 without damaging straps 18, 20 or 22 while preventing substantial wear of walls 100 and 102 as well as the side wall of appendage 78.

Ring mold segments 68 and 69 include passage 118 that enters opening 104 below cavity 112 where sole 12 is formed. Passage 118 is aligned with corresponding passage 120 (FIGS. 9 and 12) in sole plate 70, located in opening 104 below cavity 112. To enable molten polyvinyl chloride to be injected into cavity 112, passage 120 includes vertically extending segment 121 that extends into groove 123 of sole plate 70.

Sole plate 70 includes vertical side wall 125 fitting snugly against side walls 100 and 102 of ring mold segments 96 and 98. Top surface 124 of sole plate 70 conforms with the bottom of platform 62 and has indentations corresponding with ribs 40–60. Sole plate 122 extends partially into cavity 112, as illustrated in FIG. 12, so the bottoms of the grooves (indicated by dotted line 127, FIGS. 12 and 13) in top surface 124 are aligned with the bottom surface of enlarged cavity portion 111.

In operation, with upper 12 in place on last 64 in sealed cavity 112 and sole plate 70 in situ, molten polyvinyl chloride is injected into the sealed enlarged cavity portion via passages 118 and 120. Some of the injected polyvinyl chloride contacts the bottom of sole piece 16 and straps 18, 20 and 22. The polyvinyl chloride contacting sole piece 16 and straps 18, 20 and 22 immediately starts to coagulate to form bonds with the fabric of the sole piece and straps.

The molding process is quite rapid, such that thousands of sandals can be formed during an eight-hour working day in a single mold cavity. Hence, it is desirable to remove the completed sandal as quickly as possible from mold cavity 112. Such removal is performed by lifting last 64 from mold cavity 112. Because of the relatively low frictional forces provided by straps 18, 20 and 22 on last 64 and suction within cavity 112, there is a tendency for sole 12 to remain in the mold cavity as the last is being lifted from the mold cavity. This tendency is overcome because of the frictional forces between ear array 88 and groove arrangement 26 formed by the ear array in sole 12. The outward flares of ear side walls 94 and 95 lift the corresponding groove sloping side walls 30 and 32 and the remainder of sole 12 from the mold cavity as last 64 is lifted from the mold cavity. The sole is easily removed from last 64 a few seconds after the last and the sandal thereon have been removed from the mold cavity.

While there has been described and illustrated one specific embodiment of the invention, it will be clear that variations in the details of the embodiment specifically illustrated and described may be made without departing from the true spirit and scope of the invention as defined in the appended claims.

I claim:

1. A sandal comprising a molded sole having a top and an upper including: a sole piece, an elastic fabric heel strap attached to the sole piece, at least one other elastic strap attached to the sole piece, the other strap extending over a forward part of a foot, the heel strap being attached to the sole adjacent the other strap, the upper being bonded to the molded sole piece during the molding process for the molded sole so the top of the molded sole is bonded with bottom surfaces of the sole piece and said straps, the top of the molded sole including a groove formed during molding of the sole, the groove on the top having an outwardly flared side wall in a cross section substantially at right angles to the top of the molded sole, the flared side wall extending in a direction so the side wall is hidden from view from the top of the molded sole.

2. The sandal of claim 1 wherein the groove includes a pair of said outwardly flared side walls in said cross section.

3. The sandal of claim 1 wherein the groove is adjacent the sandal heel.

4. The sandal of claim 1 wherein the top of the molded sole includes a plurality of said grooves.

5. The sandal of claim 4 wherein the bottom of the molded sole includes molded ribs between void regions, the ribs and void regions being formed during the same molding operation as the sole and groove.

6. The sandal of claim 5 wherein the ribs and voids are arranged so the sandal includes a platform having a substantially constant thickness between a bottom surface and an upper surface forming an insole,
a flange depending downwardly from a peripheral edge of the bottom surface, the flange having a bottom flat edge that lies substantially in a single plane, and
many strengthening ribs extending downwardly from the platform bottom surface and having bottom flat edges lying substantially in the same plane as the bottom flat edges of the flange, said ribs extending lengthwise generally at right angles to the longitudinal axis of the sole between and in engagement with opposite portions of the flange, at least some of said ribs crossing each other at regions removed from the flange.

7. The sandal of claim 6 wherein the ribs and voids are arranged so the sandal includes a platform having a substantially constant thickness between a bottom surface and an upper surface forming an insole,
a flange depending downwardly from a peripheral edge of the bottom surface, the flange having a bottom flat edge that lies substantially in a single plane, and
many strengthening ribs extending downwardly from the platform bottom surface and having bottom flat edges lying substantially in the same plane as the bottom flat edges of the flange, said ribs extending lengthwise generally at right angles to the longitudinal axis of the sole between and in engagement with opposite portions of the flange, at least some of said ribs crossing each other at regions removed from the flange.

8. The sandal of claim 4 wherein the plural grooves are concentric with each other.

9. The sandal of claim 8 wherein the grooves, from a top view of the sole, have a generally broken re-entrant configuration.

10. The sandal of claim 8 wherein the grooves, from a top view of the sole, have a generally annular configuration.

11. The sandal of claim 4 wherein the grooves are adjacent the sandal heel.

12. The sandal of claim 1 wherein the bottom of the molded sole includes molded ribs between void regions, the ribs and void regions being formed during the same molding operation as the sole and groove.

13. The sandal of claim 12 wherein the ribs and voids are arranged so the sandal includes a platform having a substantially constant thickness between a bottom surface and an upper face forming a surface for receiving a foot of a wearer,
a flange depending downwardly from a peripheral edge of the bottom surface, the flange having a bottom flat edge that lies substantially in a single plane, and
many strengthening ribs extending downwardly from the platform bottom surface and having bottom flat edges lying substantially in the same plane as the bottom flat edges of the flange, said ribs extending lengthwise generally at right angles to the longitudinal axis of the sole between and in engagement with opposite portions of the flange, at least some of said ribs crossing each other at regions removed from the flange.

14. The sandal of claim 13 wherein the lengths of the ribs and the flange in planes at right angles to the plane of the bottom flat edge are such that a heel portion of the insole is elevated with respect to the planar surface relative to the elevation of a ball of the foot portion of the insole.

15. The sandal of claim 13 wherein the top of the molded sole includes plural grooves, each having an outwardly flared side wall in a cross section substantially at right angles to the top of the molded sole.

16. The sandal of claim 13 wherein at least some of the ribs are arcuate.

17. The sandal of claim 16 wherein a rib at a forward end of a heel portion is straight and engages an arcuate rib at intersections of the straight rib and the flange on opposite sides of the sole.

18. The sandal of claim 17 wherein a pair of arcuate ribs between the back of the heel and the straight rib are curved oppositely to each other and intersect each other and the flange on opposite sides of the sole.

19. The sandal of claim 18 wherein a pair of arcuate ribs in the vicinity of the arch of the foot intersect each other in a central part of the soie.

20. The sandal of claim 19 wherein several first arcuate ribs are located between the vicinity of the ball and the forward end of the sole and several second arcuate ribs are located between the vicinity of the ball of the foot and the vicinity of the arch, the first arcuate ribs being curved toward the forward end of the sole, second arcuate ribs being curved toward the heel of the sole.

21. The sandal of claim 20 wherein some of the first and second ribs cross each other at positions removed from the flange.

22. Footwear comprising a molded sole having multiple bottom grooves formed during molding of the sole and a top and an upper including a sole piece and foot encircling material attached to the sole piece, the upper being bonded to the molded sole during the molding process for the molded sole so the top of the molded sole is bonded with bottom surfaces of the sole piece and said straps, the top of the molded sole including a groove formed during molding of the sole, the groove on the top having an outwardly flared side wall in a cross section substantially at right angles to the top of the molded sole, the flared side wall extending in a direction so the side wall is hidden from view from the top of the molded sole.

23. The footwear of claim 22 wherein the groove includes a pair of said outwardly flared side walls in said cross section.

* * * * *